United States Patent

[11] 3,587,957

| [72] | Inventor | Paul Wildi<br>San Diego, Calif. |
|---|---|---|
| [21] | Appl. No. | 795,983 |
| [22] | Filed | Feb. 3, 1969 |
| [45] | Patented | June 28, 1971 |
| [73] | Assignee | Gulf Energy & Environmental Systems,<br>Inc.<br>San Diego, Calif. |

[54] APPARATUS FOR CRACKING LAMINATED STRUCTURES
10 Claims, 8 Drawing Figs.

| [52] | U.S. Cl. | 225/104,<br>72/706 |
|---|---|---|
| [51] | Int. Cl. | B26f 3/04 |
| [50] | Field of Search | 72/56, 706;<br>29/421; 225/103, 104 |

[56] References Cited
UNITED STATES PATENTS

| 3,108,325 | 10/1963 | Harvey et al. | 72/56 |
|---|---|---|---|
| 3,279,228 | 10/1966 | Brower | 72/56 |
| 3,323,202 | 6/1967 | Brower et al. | 72/56 |
| 3,372,566 | 3/1968 | Schenk et al. | 72/56 |
| 3,447,350 | 6/1969 | Schenk | 72/56 |

*Primary Examiner*—Richard J. Herbst
*Attorney*—Anderson, Luedeka, Fitch, Even and Tabin ABSTRACT: Apparatus is described for cracking a laminated structure of metal sheets for an electromagnetic device, such as a stator or rotor for an electric motor. A hammer is displaced by magnetic forces, produced by electrical actuation of a coil assembly, to engage the laminated structure and impart sufficient strain thereto as to effect the desired cracking.

INVENTOR.
PAUL WILDI
BY
Anderson, Luedeka, Fitch, Even, & Tabin
ATTORNEYS

PATENTED JUN 28 1971 3,587,957
FIG. 5.
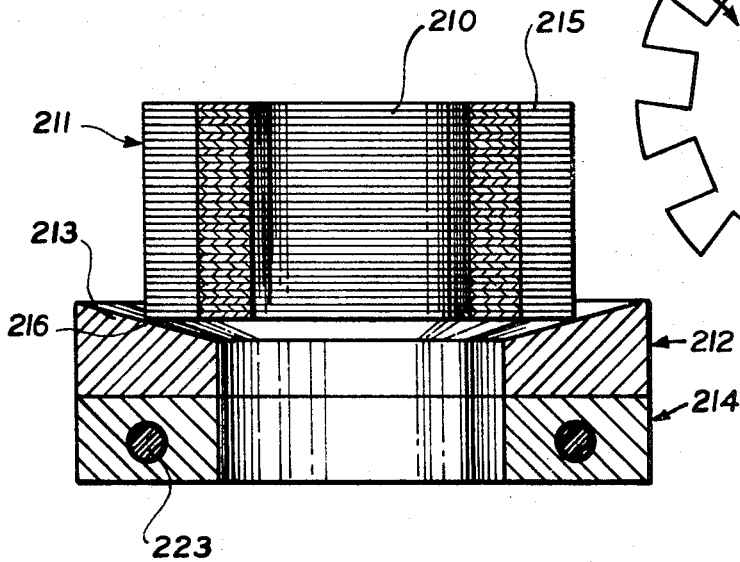
FIG. 6.
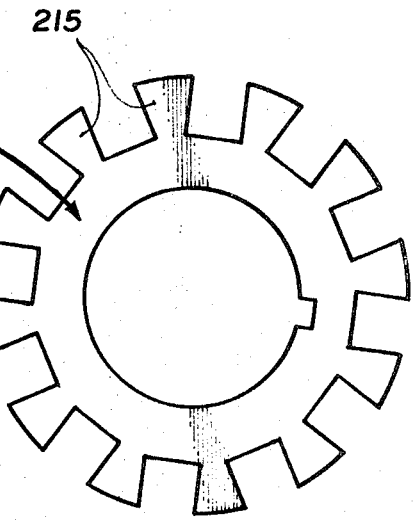
FIG. 7.
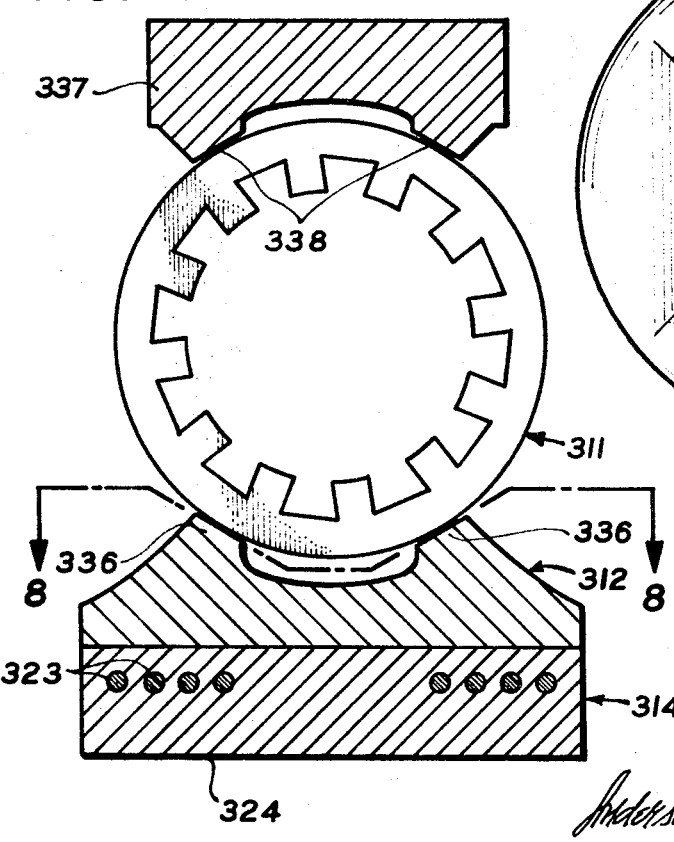
FIG. 8.
INVENTOR.
PAUL WILDI
BY
*Anderson, Luedeka, Fitch, Even & Tabin*
ATTORNEYS

APPARATUS FOR CRACKING LAMINATED STRUCTURES

This invention relates to apparatus for cracking a laminated structure of metal sheets for an electromagnetic device, such as an electric motor stator or rotor, or an electrical transformer core.

Certain types of electromagnetic devices incorporate laminated structures of metal plates or sheets. For example, the stators or rotors of electrical motors, and the cores of electrical transformers, are sometimes comprised of a stack of laminations of a low loss electrically conductive material, such as high silicon steel. Typically, the laminations are formed in the desired shape by punchings from blank strips of the metal material. After stacking, the laminations are suitably joined by a convenient expedient such as weld beads running parallel with the axis on the outside of the stack, rivets extending through the stack and parallel with the axis toward the outside of the stack, or by peened in clips extending parallel with the axis in corresponding grooves in the outer surface of the laminated structure.

In order to minimize any current losses due to the free flow of electricity between the individual sheets, various expedients have been utilized. Such expedients include the deburring of the individual sheets and insulation of the sheets prior to stacking, for example, by coating the sheets with varnish or by utilizing sheets that are preinsulated by a suitable chemical treatment. Another approach which is more satisfactory in many instances consists of annealing the stacked laminations in an atmosphere which will form a dense oxide on the surface of the laminations as well as tend to burn off the fine burrs remaining from the punching process.

When laminated structures are treated in accordance with the latter annealing process, electrical losses remain unsatisfactorily high unless the structure is subjected to mechanical shocks of various sorts to break up contact between the laminations and thus create an effective insulation. This process is commonly referred to in the industry as "cracking." Typical methods of cracking laminated structures of metal sheets have included dropping the lamination stacks from a predetermined height along a stud onto a suitably shaped mandrel, contacting the laminated structures by airhammers, or striking two laminated structures together manually.

Heretofore known methods of cracking laminated structures have been undesirable in that, due to unreliability and inconsistency in results, 100 percent of the laminated structures usually have to be inspected by a check of their losses compared with an acceptable minimal FIG. Those structures which are unsatisfactory must then be returned for a second or third cracking operation before they achieve the desired level of losses.

The use of magnetic forming principles, that is, the production of mechanical forces by interaction between varying magnetic fields, produces a high level of sudden mechanical force. Accordingly, the employment of magnetic forming principles to the cracking of laminated structures appears to be a promising solution to the problem. Because the typical material of laminated structures is low-loss high resistivity material, magnetic forming techniques may encounter difficulty in the efficiency of operation. This is because efficient magnetic impulse transfer to the workpiece requires a high conductivity material. Moreover, various magnetic-forming techniques to effect cracking of laminated structures may not provide sufficient strain all the way through the laminated structure, and therefore necessitate more than one impulse or more than one magnetic shock device.

It is an object of the present invention to provide improved apparatus for cracking a laminated structure such as may be utilized as a stator or a rotor in an electric motor.

Another object of the invention is to provide apparatus having high efficiency for using a magnetic impulse to crack a laminated structure.

It is another object of the invention to provide apparatus which is capable of cracking relatively large laminated structures with a single magnetic impulse.

Other objects of the invention will become apparent to those skilled in the art from the following description, taken in connection with the accompanying drawings wherein:

FIG. 5 is a full section side view of an alternative embodiment of the apparatus for cracking a laminated structure in a slightly different manner;

FIG. 6 is a top view of the laminated structure illustrated in FIG. 5;

FIG. 7 is a full section side view illustrating a still further embodiment of the invention; and FIG. 8 is a sectional view taken along the line 8-8 of FIG. 7.

Very generally, the apparatus of the invention is for cracking a laminated structure 11 of metal sheets such as may be utilized as a stator or a rotor in an electric motor. The apparatus comprises a hammer 12 having a portion 13 thereof shaped for engaging a laminated structure and producing a strain thereon to crack the laminations upon displacement of the hammer. The hammer has at least a portion thereof comprised of electrically conductive material. The hammer is supported for displacement and, upon electrical energization of a coil assembly 14, the hammer is displaced by the production of a magnetic field.

Apparatus for forming material by employing varying magnetic fields of high intensity is well known in the art, an example of such apparatus being shown and described in the U.S. Pat. No. 2,976,907 assigned to the assignee of the present invention. In apparatus of this general type, an electric current pulse of high amperage is passed through a coil or winding to provide a desired magnetic field of high intensity. The current pulse may be applied to the coil directly from a current pulse source, such as a capacitor bank. A conductive workpiece positioned in the pulsed magnetic field produced by the coil has a current pulse induced in it. This current pulse interacts with the pulsed magnetic field to produce a force acting on the workpiece. If the workpiece is supported against movement and if the force resulting from the magnetic field is sufficiently strong, a deformation of the workpiece results. If desired, an additional member of conductive material, commonly referred to as a field shaper, may be disposed intermediate the coil and the workpiece in order to produce a desired concentration of the magnetic field.

Laminated structures of low-loss, high resistivity metal, such as is typically the case in electric motor stators and rotors, and in transformer cores, are inefficient as workpieces. Thus, cracking operations wherein a pulsed magnetic field acts on the laminated structure may not provide sufficient strain to effect the desired results in a single pulse, especially with relatively large laminated structures. This increases operational costs undesirably.

In accordance with the invention, the basic principle of magnetic forming is utilized but a hammer supported for displacement is moved by the forces created by the pulsed magnetic field. In order to provide this movement, at least a portion of the hammer is comprised of a conductive material which has a current pulse induced in it by the varying magnetic fields produced by the winding or, if used, the field shaper. This current pulse interacts with the pulsed magnetic field to produce a force displacing the hammer. The displacement of the hammer and the shape of the portion thereof which engages the laminated structure are such as to produce the desired cracking of the laminated structure.

Figure 1:
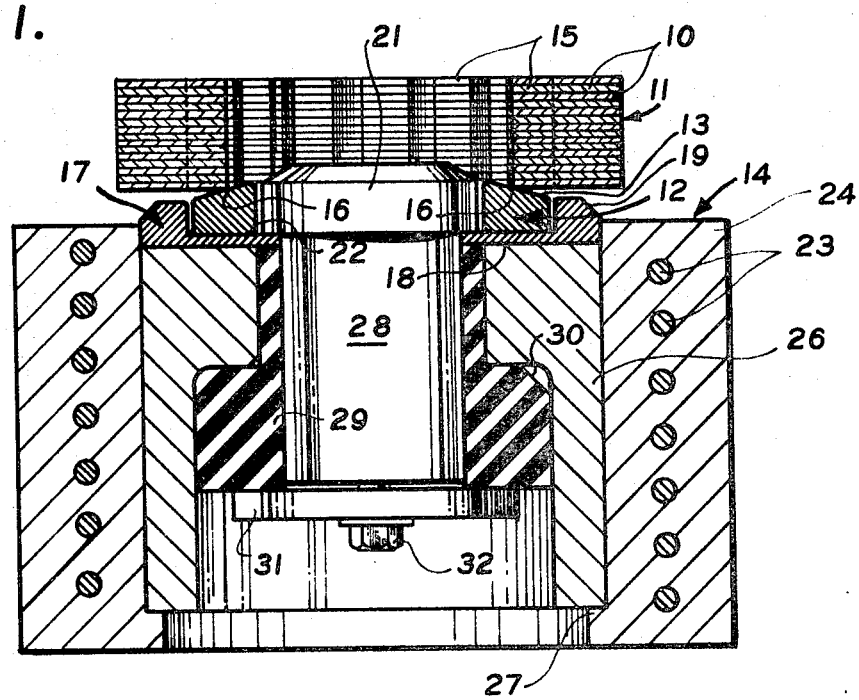
FIG. 1 is a full section side view of apparatus constructed in accordance with the invention.

Referring now to FIG. 1, a preferred embodiment of the invention is illustrated. The individual laminations 10 of the laminated structure 11 are punched out with a central opening and teeth 15 extending radially inward (as in FIG. 7). When stacked together, the laminations form a generally annular structure of a generally rectangular cross section and with inwardly extending teeth. The structure 11 rests on the upper surface 13 of the hammer 12. The hammer 12 is annular and is of a mean diameter such that the inner lower corners 16 of the teeth 15 on the lowest lamination 10 of the laminated structure 11 rest on and are supported by the upper surface 13. The upper surface 13 is frustoconical in shape so that the actual contact of the hammer 12 with the laminated structure 11 occurs only at the corners 16. If desired, a separate support may be provided for the laminated structure so that the hammer has a short distance of free travel before engaging the structure.

The hammer 12 rests on an annular insulator 17 comprised of a suitable electrically insulative material, such as polypropylene. The annular insulator 17 includes a generally flat shelf portion 18 and a thicker outer bead portion 19 integral therewith. This forms an annular recess in which the hammer 12 is received. Filling the interior space of the annular hammer 12 is a central guide cap 21. The guide cap 21 has a generally cylindrical outer surface 22 which mates with the interior surface of the hammer 12 with a fit which is sufficiently loose as to enable axial movement of the hammer, but which is sufficiently tight to maintain the hammer generally in the position illustrated with respect to movement transversely of the axis of the hammer. The guide cap 21 is supported by means described subsequently.

The coil assembly 14 includes a helical conductive winding 23, the axis of which is aligned with the axis of the hammer 12 and the annular laminated structure 11. The winding 23 is embedded in an annular supporting body 24 of a suitable structural and insulating material, such as a phenolic compound. Suitable connection, not illustrated, is made from the ends of the winding 23 to a source of high current pulses, such as a capacitor bank. Such sources are well known in the art in connection with magnetic forming apparatus of the type described in connection with the aforesaid U.S. Patent.

The interior of the block 24 is of sufficient diameter to accommodate the insulator 17 and a field shaper 26 of the same outer diameter as the insulator. The field shaper 26 is generally annular in configuration and is of a cross section roughly in the shape of an inverted L wherein the shorter leg is of substantially greater thickness than the longer leg. The lower edge of the field shaper 26 rests upon an inwardly projecting shoulder 27 surrounding the interior of the block 24 at the lower edge thereof. The field shaper 26 does not form a complete ring, but rather has a slot, not shown, therein in order that the field shaper will not constitute a closed loop. The upper surface of the field shaper 26 supports the annular insulator 17. The field shaper aids in concentrating the pulsed field in the optimum region, as is known in the art. Under some circumstances, however, an arrangement similar to that shown in FIG. 1 may be used without employing a field shaper.

Completing the coil assembly 14 is a central peg 28 of phenolic material, a spacer 29, also of phenolic material, a glass-fiber washer 31, and a bolt 32. The bolt 32 extends through an axial opening, not shown, in the central peg 28 and threads into the guide cap 21. The washer 31 is of sufficient diameter to overlap the lower end of the spacer 29. The spacer 29, which is hollow and roughly cylindrical, has a much thicker wall diameter at the lower end extending out to the wider inner diameter wall of the field shaper 26. Accordingly, the outer shape of the spacer 29 conforms with the interior shape of the field shaper, except for an annular chamfer 30 to facilitate assembly. The central peg 28 is cylindrical and conforms with the cylindrical inner wall of the spacer 29. When the bolt 32 is tightened, the tendency to draw the end cap 21 and the washer 31 axially toward each other holds the inner rim of the flat web 18 against the upper end of the spacer 29. This, coupled with the mating configuration of the outer surface of the spacer 29 with the inner surface of the field shaper 26 provides a compact and rigid assembly in which an annular groove on the upper portion thereof accommodates and supports the annular hammer 12.

In the unenergized state of the apparatus, the hammer 12 rests on the shelf 18 of the insulator 17 by virtue of its own weight and, if desired, return springs, which are not shown. To operate the apparatus, the workpiece or laminated structure 11 is placed on top of the hammer 12, making contact with the upper surface 13 of the hammer at the lower corners 16 of the teeth 15. The contact is therefore at the tip of the teeth 15 whereas the main annular body or yoke of the laminated structure 11 is unsupported. Upon energization of the winding 23 y the pulse source, not shown, the hammer 12 is driven sharply upward against the laminated structure 11, transmitting a sharp impulse to the corners 16. The inertia of the mass represented by the remaining annular outer portion of the laminated structure 11 resists the acceleration imparted to the laminated structure by the hammer 12. The resulting strain cracks the laminations by providing sufficient displacement therebetween. If necessary, an additional mass or other type of mechanical restraint may be placed bearing against the upper surface of the laminated structure 11 toward the outer part thereof.

The described apparatus is adaptable to a production arrangement which is highly efficient. The coil assembly may be mounted flush with the top of a work table, and the laminated structures to be cracked may be slipped across over the hammer in succession. Where the hammer is made of sufficient width in the radial direction, the same hammer will accept laminated structures of varying diameters as long as the inside lower corners rest somewhere on the face 13 of the hammer.

Figure 2:
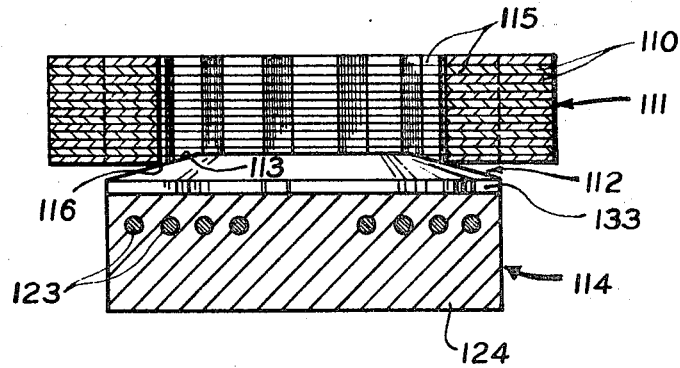
FIG. 2 is a full section side view of an alternative embodiment of the invention.

Referring now to FIG. 2, an alternative embodiment of the invention is illustrated. Elements of the apparatus of FIG. 2 having functions similar to corresponding elements in the apparatus of FIG. 1 have been given identical reference numerals, preceded by a 1. In the embodiment of FIG. 2, the winding 123 of the coil assembly 114 is of spiral configuration, rather than helical, and the block 124 is a disc shape rather than annular. The hammer 112 is formed as a shallow truncated cone, the lower face of which is provided with a layer 133 of a highly electrically conductive material. The slanted or frustoconical surface 113 of the hammer 112 engages the inner lower corners 116 of the teeth 115 of the laminated structure 111. No field shaper is utilized in this embodiment.

When the spiral winding 123 is energized, the currents induced in the layer 133 result in the hammer 112 being displaced sharply upward to engage the laminated structure 111 and effect cracking of the laminations 110 therein. A suitable guide, not illustrated, may be provided for guiding the hammer 112 through an axial movement. If desired, a mass opposing the action of the hammer 112 may be provided as described in the previous embodiment. Return springs, also not shown, may be provided to retain the hammer 112 against the upper surface of the block 124 when the apparatus is deenergized. The advantages of such a construction are similar to the advantages set out in connection with the embodiment of FIG. 1.

Figure 3:
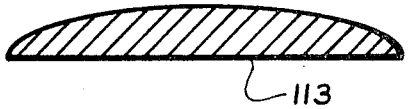
FIGS. 3 and 4 illustrate alternative shapes for the hammer element utilized in the embodiments of FIGS. 1 and 2.
Figure 4:
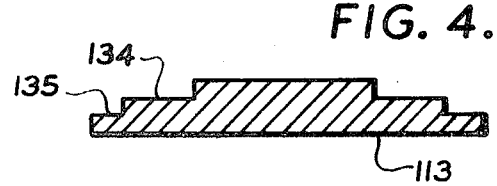

The shape of the hammer 112, that is, frustoconical, is not critical to the invention in either of the above-described embodiments. Thus, instead of a frustoconical surface, the hammer, whether solid or annular, may have a surface 13 or 113, shaped generally spherical as shown in FIG. 3 or having an annular recess or recesses 134 and 135 therein as shown in FIG. 4, for engaging the teeth of the laminated structure at the innermost lower corners thereof.

In FIG. 5, a modification of the invention is illustrated for cracking laminated structures from which teeth extend radially outward, such as the rotor of an electric motor. The drawing is schematic and elements thereof having a function similar to elements in the embodiment of FIG. 1 have been given identical reference numerals preceded by a 2. Thus, the rotor or laminated structure 211 rests on the upper frustoconical surface 213 of the annular hammer 212. The hammer rests on the upper surface of a coil assembly 214 which has a winding therein energizeable as previously described. The field produced by the energization of the winding 223 results in an axial upward force exerted on the hammer 212 to engage the outer lower corners 216 of the rotor teeth 215 to crack the laminations 210 thereof. The actual configuration of the rotor 211 may be more clearly observed from the top view thereof in FIG. 6.

In some instances it may e advantageous to strain an annular laminated structure, such as a stator, across its diameter so as to temporarily push it into an oval shape for cracking the laminations. Illustrated in FIGS. 7 and 8 is apparatus for effecting such a strain in a highly efficient manner. Once again, elements of the illustrated apparatus in FIGS. 7 and 8 having functions similar to elements of the apparatus of FIG. 1 have been given identical reference numerals, preceded by a 3.

The coil assembly 314 of the apparatus is similar to coil assembly 114 illustrated in the embodiment of FIG. 2, and comprises a spiral winding 323 embedded in an insulating block 324. The hammer 312 rests upon the upper surface of the block and its upper portion has a pair of parallel elongated ridges 336 shaped for engaging the outer cylindrical surface of the laminated structure 311. As may be seen from viewing FIGS. 7 and 8, the elongated ridges 336 form a cradle in which the outer cylindrical surface of the laminated structure 311 rests. A mass 337 having a pair of elongated ridges 338 thereon similar to the ridges 336 rests on the laminated structure 311 at a position diametrically opposite from the hammer 312. When the winding 323 is energized, the hammer 312 is driven against the laminated structure 311 which will temporarily be driven into a slight oval shape, thus effecting the desired cracking.

While the foregoing examples are all related to electric motors, the apparatus of the invention is not limited to cracking laminated structures for electric motors. Thus, the apparatus is applicable to other laminated structures for electromagnetic devices, such as transformer cores. The apparatus of FIGS. 7 and 8 is particularly adaptable to the cracking of transformer cores of either the wound or punched types.

It may therefore be seen that the invention provides improved apparatus for cracking laminated structures of metal sheets such as may be utilized as a stator or a rotor in an electric motor. The apparatus utilizes a magnetic impulse to provide a severe shock to the laminated structure. The shock is provided by a hammer which is actuated by the magnetic impulse. The apparatus of the invention is highly efficient in operation and is capable of cracking relatively large laminated structures with a single impulse.

Various modifications of the invention in addition to those shown and described herein will become apparent to those skilled in the art from the foregoing description and accompanying drawings. Such modifications are intended to fall within the scope of the appendant claims.

I claim:

1. Apparatus for cracking a laminated structure of metal sheets, comprising, a hammer having a portion thereof for engaging the laminated structure, said hammer having at least a portion thereof comprised of electrically conductive material, means supporting said hammer for displacement, and a coil assembly for producing a magnetic field upon electrical energization of said coil assembly, said coil assembly being positioned adjacent said conductive portion of said hammer to produce a displacing force upon energization of said coil assembly, said structure engaging portion of said hammer being shaped such that the inertia of the laminated structure and the force imparted thereto by said hammer cause displacement between the metal sheets of the laminated structure.

2. Apparatus according to claim 1 for cracking a laminated structure comprising a stack of generally annular laminations, wherein said hammer includes a frustoconical surface for engaging the stack only at corners thereof.

3. apparatus according to claim 2 wherein the axis of said frustoconical surface coincides with the direction of displacement of said hammer.

4. Apparatus according to claim 1 for cracking a laminated structure comprising a stack of generally annular laminations, wherein said hammer includes a generally spherical surface for engaging the stack only at the corners thereof.

5. Apparatus according to claim 1 for cracking a laminated structure comprising a stack of generally annular laminations, wherein said hammer includes a recess therein for engaging the stack only at corners thereof.

6. Apparatus according to claim 1 for cracking a laminated structure comprising a stack of generally annular laminations, wherein said hammer includes a cradle for engaging the stack of laminations along the side thereof to effect cracking by temporarily straining the generally annular laminations into an oval shape.

7. Apparatus according to claim 1 wherein said coil assembly includes a primary winding and a field shaper disposed adjacent said primary winding.

8. Apparatus according to claim 1 wherein said hammer is displaceable upwardly and is adapted to support the stack resting thereon.

9. Apparatus according to claim 1 and including means for providing a mass engaging the laminated structure on the opposite side thereof from said hammer to provide inertia to the action of said hammer.

10. Apparatus according to claim 1 wherein said hammer is positioned a predetermined distance from the laminated structure to provide a distance of free travel prior to impact.